INVENTOR.
Martin C. Falk

HIS ATTORNEYS

United States Patent Office 3,364,773
Patented Jan. 23, 1968

3,364,773
DRIVE MECHANISM FOR FURNACE VESSELS AND THE LIKE
Martin C. Falk, Pittsburgh, Pa., assignor to Pennsylvania Engineering Corporation, New Castle, Pa., a corporation of Pennsylvania
Filed Jan. 3, 1966, Ser. No. 518,245
19 Claims. (Cl. 74—421)

This invention relates to a drive mechanism or apparatus for heavy equipment and particularly, to drive and snubber mechanism for rotationally mounted equipment that is subjected to variable forces or wide volumetric temperature changes during its usage.

Basic Lakin et al. U.S. Patent No. 3,207,002 discloses means for such a type of usage which, as in the case of the present disclosure, particularly brings out its application to the field of apparatus suitable for rotating, turning or tilting metal-making or processing units or vessels in the nature of Bessemer and oxygen blowing converters and other metal refining equipment.

A heavy tonnage converter vessel is conventionally provided with a pair of oppositely-extending trunnion shaft portions or shafts, stationary means or stands for supporting and journaling the shaft portions adjacent opposite sides of the vessel, and driving means operatively-associated with at least one of the shaft portions for actuating or turning the vessel. This enables the vessel to be turned from a substantially upright operating position to tilted, charging and pouring positions. Such a vessel is subjected to high metal or steel melting and processing temperatures and to at least some cooling between metal heats. Due to the somewhat oblong or eccentric shape of the vessel and the nature of the load, the driven trunnion shaft and means associated therewith for driving it is subjected to misalignment and off-balanced forces that contribute to the problem of providing a suitable driving mechanism and of resisting and containing coincidental turning and axial movement of a housing or other associated or supporting means for the driving mechanism, as well as in maintaining a suitable operating aligned relation or engagement between its cooperating driving and driven parts or elements.

My invention deals with the provision of a simplified and improved driving means, apparatus or structure in which various factors entering into the problem are met in such a manner as to lower the cost of the construction and minimize maintenance thereof;

My invention also deals with means or structure that provides an optimum operating positioning between driving and driven parts of a gear unit, such as of a reduction unit, employed for turning the shaft of heavy equipment, such as a converter vessel;

Another object of my invention has been to provide for and drive heavy equipment in a better balanced, lowered center of gravity manner;

Another object has been to position or employ driving means in such a manner as to provide it with better resistance to turning movement thereof about a shaft portion of equipment being actuated;

A further object of my invention has been to devise an improved construction and utilization of a turning movement resisting means, such as a torque-snubber, for a rotationally-mounted gear unit or housing employed with a tilting or turnable metal processing unit;

These and other objects of my invention will appear to those skilled in the art from the illustrated embodiment of the drawings and the description thereof.

In the drawings, FIGURE 1 is a side view in elevation showing a construction embodying my invention as applied to a trunnion shaft or shaft portion of a converter vessel;

Figure 1:
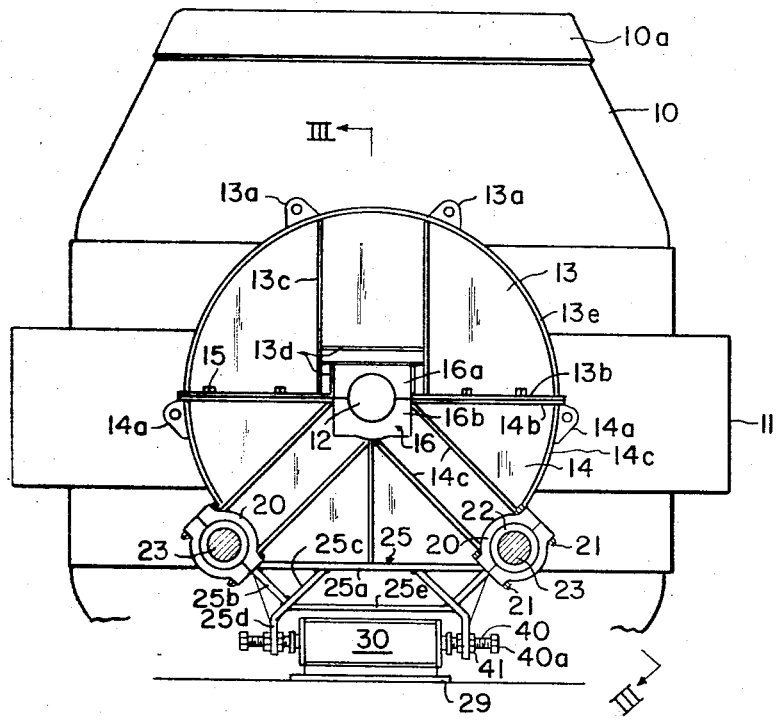

In carrying out my invention, I provide a drive structure or unit B of a gear reduction type whose housing 13–14 is shown rotatably or turnably mounted on an end portion of a trunnion shaft portion 12 of a converter vessel 10 for coincident axial movement therewith, outwardly beyond its side stand A. The housing of the drive unit B encloses or contains a centrally-located, driven, bull gear 46 and a pair of relative small gears or drive pinions 45 that have a bottom-mounted positioning in a balanced, offset relation with respect to the trunnion shaft portion 12 and that mesh, in a spaced relation with each other, adjacent lower reaches of the periphery of the gear 46. The gear 46 and the pinions 45 are shown of a herringbone but may also be of a helical type. The housing made up of upper and lower parts 13 and 14 is provided with a centrally-axially-aligned and positioned torque snubber or rotation-resisting unit 30 that cooperates therewith and that also permits and controls coincidental axial movement of the housing. The housing has a pair of opposed, spaced-apart arm portions 25d that are shown projecting adjacent a bottom portion thereof beneath and within the central spacing between the drive gears 45 and their associated drive shafts 23. The opposed arms 25d enable the use of a single snubber unit 30 in a highly effective manner in an operating position therebetween.

Figure 5:
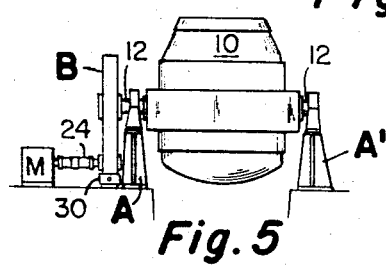
FIGURE 5 is a greatly reduced, somewhat diagrammatic, front view in elevation showing a typical utilization of a construction of my invention.

In FIGURE 1, I have shown a typical converter vessel 10, such as used for an oxygen blow operation, for making steel in an upright or metal processing position in which its open mouth portion 10a may receive an oxygen lance. The vessel 10 has a central reinforcing metal band 11 about its circumference from which trunnion shaft portions 12 extend outwardly from opposite sides of the vessel. The shaft end portions are customarily rotatably-carried in bearing mountings on a pair of spaced-apart stands or stationary means A and A' adjacent opposite sides of the vessel (see FIGURE 5). In FIGURE 5, I have illustrated a drive unit B of my construction operatively-mounted on shaft portion 12 adjacent the outer end thereof and beyond its stand A.

Figure 2:
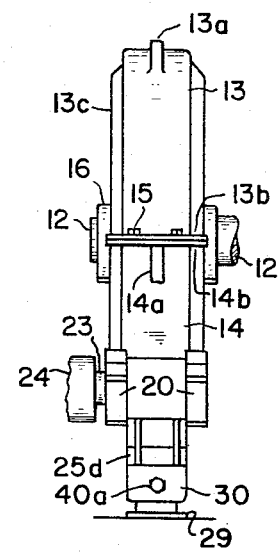
FIGURE 2 is an end view in elevation on the scale of FIGURE 1 showing the drive construction of my invention but with the vessel and its stands omitted for simplicity.

The housing for the gear drive, in the nature of a gear reduction unit, is shown made up of an upper part or half 13 of semi-circular shape and a lower part or half 14 of a cooperating, substantially semi-circular shape. Each part 13 and 14 is provided with eyelet lugs or ears 13a and 14a so that it can be readily lifted into and out of place in assembling the construction and in disassembling it in connection with maintenance and repair thereof. The two parts 13 and 14 have outwardly-projecting cooperating face flanges 13b and 14b that may, as shown in FIGURES 1 and 2, be demountably-secured together by suitable bolts 15. As shown particularly in FIGURES 1 and 3, the housing, at its opposite ends, carries front and back trunnion bearings 16 and 16' for rotatably-mounting the housing parts 13 and 14 on the shaft portions 12. These bearings may be of an end thrust type to maintain the housing against axial movement in a set position on the shaft 12; this is also assured by a central hub portion 47 of the large driven gear 46.

The bearings 16 and 16' may be of the same construction.

As shown in FIGURE 1, each bearing, such as the bearing 16, has an upper half or portion 16a secured to project from the upper housing part 13 and has a cooperating lower half 16b that is secured to and projects from the lower housing part 14. It is thus apparent that when the two housing parts 13 and 14 are bolted together that the halves of the bearings 16 and 16' are held in a cooperating assembled relation about the shaft 12.

The lower housing part 14 carries a pair of split bearing assemblies 20 which are adapted to journal a pair of drive shafts 23. The bearing assemblies 22 and drive shafts 23 are positioned in a balanced, spaced-apart relation with each other at lower ends of downwardly-outwardly extending diagonals from the shaft 12, adjacent the bottom portion of the housing of the unit B. That is, the assemblies 22 have a horizontally-spaced and balanced relation on the gear housing on opposite sides of a vertical line representing a vertical extension of the shaft 12 and the center of gravity of the housing. Their positioning serves to lower the center of gravity of the housing in its positioning on the shaft portion 12.

Figure 3:
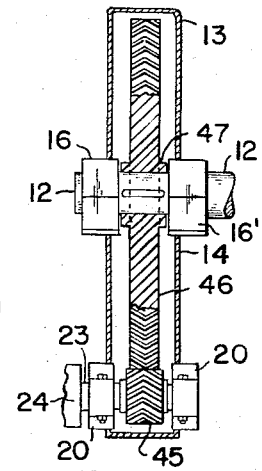
FIGURE 3 is an end section in elevation on the same scale as and taken along the line III—III of FIGURE 1.

As shown particularly in FIGURES 1 and 3, each bearing assembly 20 positions a sleeve bearing 22 therein, has an upper half or part that is carried by the housing part 14 and has a separable lower half or part that is removably-secured thereto by nut and bolt assemblies 21. It will be further noted that the lower housing part 14 has a pair of diagonally-extending, outwardly-projecting, spaced-apart, downwardly-outwardly-sloped pairs of outwardly-projecting, diagonal reinforcements 14c that extend from the lower bearing half 16b to one part or half of each of the bearings 20. A central reinforcing portion 14d extends vertically from the apex of the portions 14c to a horizontal, cross-extending reinforcing portion 25a to define an enclosed framing. It will also be noted that the upper housing part 13 has a pair of spaced-apart, vertically-extending, outwardly-projecting, reinforcing portions 13c therealong which cooperate with central, horizontally and vertically-extending reinforcing positions about the bearing half 16a to centrally reinforce it.

The drive shafts 23 may either consist of motor shafts or may be separate shafts connected by a flexible drive coupling 24 to individual electric motors M, see FIGURE 5. That is, the motors may be directly carried by the housing or may be mounted on a stationary base and connected to the drive shafts by a coupling 24 for permitting limited coincidental axial and turning movement of the shafts 23 with the housing.

The lower housing part 14, as shown particularly in FIGURE 1, is provided with a reinforced snubber or stabilizer frame 25 that has connected framing portions defining an enclosed framing. The frame 25 has a horizontal, cross-extending portion 25a connected between the upper halves of the bearings 22 to define an angular type of reinforcing structure in a balanced and aligned relation beneath the bearing 16 and the shaft portion 12. The reinforcing frame 25 also has a pair of outwardly-sloped, spaced-apart, diagonal portions 25c that are secured in a sidewise-balanced, spaced-apart relation and having lower, substantially vertical, opposed, vertically-downwardly-projecting arm portions 25d with which a snubber unit or means 30 cooperates. The reinforcing portions 25c define a triangular, closed figure in cooperation with downwardly-inwardly sloped reinforcing portions 25b which extend from the horizontal portion 25a adjacent the upper halves of the bearing assemblies 20 to lower positions opposite a second and under-positioned horizontal bracing or reinforcing portion 25e. The portion 25e defines a closed figure with the portions 25a and 25c.

It will be apparent that reinforcing portions 13b, 13c, 13d and rim portion 13e of the upper housing part 13 define closed reinforcing structures. In like manner, reinforcing portions 14b, 14c, 14d, 25a and rim portion 14e define closed structures for the lower housing part 14. Further, the snubber frame structure as represented by 25 is defined by closed reinforcing portions 25a, 25b and 25c and by portions 25a, 25c and 25e and has a centrally-balanced, underpositioned relation with respect to the center of gravity of the assembly, beneath the shaft portion 12.

As shown particularly in FIGURE 3, the large, main or bull driven gear 46 is keyed or feathered on the shaft 12 for rotation therewith to actuate it in turning the vessel 10 between its various positions. The gear 46 is driven by the pair of diagonally or angularly-disposed, outwardly-positioned, driving pinion gears 45 that are in a like manner keyed or feathered on drive shafts 23. It will thus be apparent that motor actuation of the shafts 23 will, in turn, effect rotation of the gear 46 and a reduced speed rotation of the shaft 12.

The location of the driving parts or elements is such that, is shown in FIGURE 1, they have a balanced, offset relation with each other adjacent the lower periphery of gear housing and the driven gear 46 and on opposite sides of an in an angularly and radially-outwardly or diagonally-balanced relation with respect to the shaft 12. As a result, turning movement of the housing or gear unit assembly on the shaft is, in effect, resisted in an inherent manner. This places a lesser load on the snubber unit 30 and lessens wear and tear on the apparatus.

Figure 4:
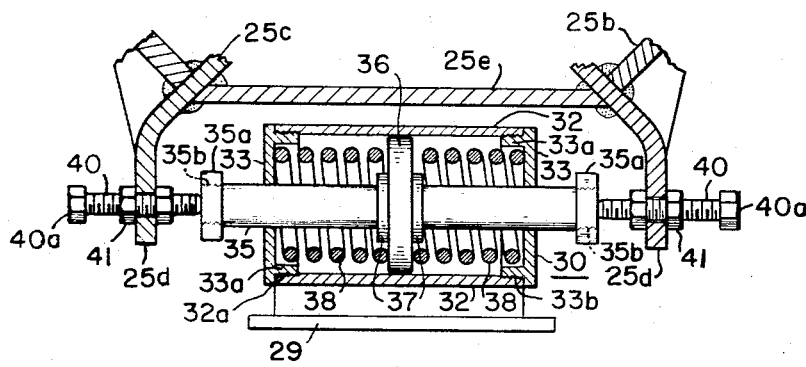
FIGURE 4 is a greatly enlarged fragmental side section in elevation of the lower part of the apparatus of FIGURE 1, particularly illustrating details of the construction of a snubber unit employed therewith.

In FIGURE 4, I have illustrated details of a construction of a suitable snubber means or unit 30 employing principles of my invention. In this connection, it will be noted that it has a stationary or fixed mounting, is located in alignment with the center of gravity of the construction and centrally between the drive shafts 23, and between the pair of opposed and projecting arms 25d, so as to effectively resist or snub turning movement of the housing or gear unit. By employing a pair of arms 25d that extend in a spaced relation in the same direction, I have been able to use a single snubber unit. The unit 30 is shown provided with a cylindrically-shaped, horizontally-extending casing 32 that is provided with internal threading 32a at its opposite ends to cooperate with male threading about inwardly-projecting annular flanges 33a of a pair of end closure parts 33. The casing 32 is shown secured on and projecting upwardly from a stationary mount or support or base plate or stand 29.

An operating piston shaft or rod 35, shown of rounded or cylindrical shape, extends through openings in the end parts 33 and has a pair of flanges 35a at its opposite, outwardly-projecting ends. As shown, the end flanges 35a may be of annular or ring shape and may be removably-secured on external threading 35b at the ends of the shaft 35. The flanges 35a serve to limit maximum inward movement of the shaft 35 by abutment with the end closure parts 33; they have outer end faces that are planar continuations of ends of the shaft 35 to provide for coincidental axis movement of the gear housing in its rotatably-mounted positioning on the shaft portion 12.

The piston rod or shaft 35 is shown provided with a piston or slide flange means 36 secured thereto by mounting flanges 37 at an intermediate or central portion for slidable, endwise movement along the inner periphery of the housing 32. A pair of tension springs 38 are shown positioned in an opposed relationship within the housing 32 to normally maintain the piston 36 in an intermediate or centered relation therewithin, and to flexibly-resist right or left-hand sliding movement of the rod or shaft 35, as imparted by rotational force exerted on the gear housing. It will be noted that each spring 38 at one end abuts the piston 36 and at its other end abuts an opposed end closure part 33 of the housing, and is loosely-positioned about the shaft 35.

As also particularly shown in FIGURE 4, the opposed snubber projections, arms or flanges 25d of the frame 25 and thus, of the gear housing and the ends of the shaft or rod 35 are provided with means operatively connecting them in such a manner that turning movement of the gear housing in either direction is imparted as endwise or axially exerted force to the ends of the rod or shaft 35, and coincidental axial movement of the gear housing is provided for and controlled by abutting slide engagement with the ends of the rod. Thus, bolts 40 constitute force transmitting means. The bolts 40 extend in an opposed relation through holes in the arms 25d, and are adjustably-secured in an appropriate tightness of engagement at their tapered inner ends with the opposite ends of the rod or shaft 35 through the agency of their wrench-flat heads 40a and a pair of clamping nuts 41.

I have found that it is ordinarily preferable to give a normal presetting of the adjustable means 40, such that the force applications on opposite sides of the piston 36 are substantially equal. However, if advisable, one bolt or force transmitting means or element 40 may be given a greater or lesser force engagement with the adjacent end of the shaft 35, so as to stress one of the springs 38 more than the other and thus cause, the piston 36 to be moved away from its central location of FIGURE 4 within the housing 32 where, for example, it is desired to provide a greater resistance to turning force in one direction than in another. It will also be noted that the engagement of the elements 40 with the shaft or rod 35 is not an integral type of engagement, in the sense that it provides for coincidental axial movements of the gear housing under temperature variations that may be encountered by permitting guided or controlled sliding movement between the shaft 35 and the ends of such means 40. If desired, in this connection, the flanges 35b may extend outwardly-endwise beyond the ends of the shaft or rod 35 to delineate the limit extent of maximum slide movement of the end surfaces presented by the shaft or rod.

Although for the purpose of illustration I have shown an exemplary embodiment of my invention, it will be apparent that various changes and modifications may be made without departing from the spirit and scope of the invention. It will also be apparent that although I have illustrated a spring type of snubber unit 30, that other suitable types may be employed, such as one using a spring or of a pair of springs with oil or gas cushions, a cylinder employing fluid movement resisting means, a two piston construction employing a fluid, or a hydraulic unit employing two cylinders, all with appropriate fluid flow check valves. It will also be apparent that additional drive means, motors or pinions may be mounted in a spaced relation about the gear housing, as needed. However, optimum results are obtained by providing a balanced, center of gravity lowering relation of the drive means, such as exemplified in FIGURE 1.

I claim:

1. In a driving apparatus for rotational mounting on a shaft portion of a heavy device positioned for rotation on opposed supports which comprises, a driven gear securely-mounted on the shaft portion for imparting rotative movement thereto, a housing rotationally-mounted on the shaft portion about said driven gear for coincidental axial movement with the shaft portion, driving gear means operatively-meshing with said driven gear and rotatably-carried by said housing, a pair of opposed arms secured to said housing and projecting downwardly in a spaced-apart relation with each other on opposite sides with respect to the shaft portion, and snubber means positioned between said opposed arms in operative engagement therewith for resisting and containing turning movement of said housing.

2. In driving apparatus as defined in claim 1 wherein, said snubber means has opposed force exerting means, and one of which engages one of said arms and the other of which engages the other of said arms to impart resistance to turning movement of said housing.

3. In driving apparatus as defined in claim 1, wherein said snubber means has a stationary casing, has an operating rod projecting from opposite ends of said casing and cooperating with said opposed arms, and has force exerting means with said casing exerting resisting force to movement of said rod in either direction along its axis.

4. In driving apparatus as defined in claim 1 wherein said snubber means has an operating rod positioned between said opposed arms, and has means for resisting movement of said rod in either direction along its axis; and adjustable means operatively connects opposite end portions of said rod with said opposed arms.

5. In a driving apparatus as defined in claim 1 wherein said snubber means has a stationary casing positioned between said opposed arms, has a rod operatively-extending through opposite ends of said casing, has piston means secured on said rod for guided movement within said casing, and has spring means about said rod in abutment with said piston means within said casing for normally maintaining said piston means in a substantially central position within said casing; and means is cooperatively-positioned between said opposed arms and opposite ends of said piston rod for imparting rotational force exerted in either direction by said housing to said rod.

6. In driving apparatus as defined in claim 1 wherein, said snubber unit has turning force resisting means extending between said opposed arms, and means cooperates with said opposed arms and said last-mentioned means to provide for coincidental axial movement of said housing with the shaft portion.

7. In driving apparatus as defined in claim 1 wherein said driving gear means has a pair of gears secured on drive shafts and rotationally-positioned by said housing adjacent a lower portion thereof in a diagonally-outwardly spaced relation with respect to the shaft portion and in a spaced-apart balanced relation with each other to lower the center of gravity of said housing in its positioning on the shaft portion.

8. In driving apparatus as defined in claim 7 wherein said opposed arms project downwardly from said housing within spacing between said drive shafts.

9. In driving apparatus as defined in claim 7 wherein said housing has partible bearing assemblies for each of said drive shafts.

10. In driving apparatus as defined in claim 7 wherein said housing has central reinforcing portions extending above the shaft portion, and has pairs of diagonal reinforcing portions extending below and from the shaft portion diagonally-outwardly towards said drive shafts; and said opposed arms are carried by a reinforced frame structure suspended beneath said housing, connected between said diagonal reinforcing portions and having closed framing reinforcing portions.

11. In driving apparatus as defined in claim 7 wherein said housing is of an upper and lower two-part construction, each of the housing parts has means for lifting them, each of the housing parts is of substantially semi-circular shape, the housing parts have cooperating abutting flange portions secured in a bolted relationship with respect to each other, said housing carries a pair of partible bearing assemblies for rotatably-positioning it on the shaft portion, one part of each of said bearing assemblies is secured on and carried by the upper housing part and the other part of each of said bearing assemblies is secured on and carried by the lower housing part, the upper housing part has a pair of horizontally spaced-apart and vertically-extending reinforcing portions projecting therealong and connected to at least one of the parts of the bearing assemblies carried by the upper housing part, the lower housing part has a pair of spaced-apart diagonally-extending reinforcing portions projecting from the lower part of at least one of said bearing assemblies to a pair of bearing assemblies carried by said lower part and journaling said drive shafts, and said lower part has a horizontally-extending reinforcing portion projecting across between said pair of bearing assemblies for said drive shafts and defining a frame structure from which said pair of opposed arms project.

12. In driving apparatus as defined in claim 7 wherein, said driven gear is a bull gear, said driving gear means has a pair of pinions that mesh with the periphery of said bull gear in a spaced-apart relation along lower portions of its periphery, motor means is operatively-connected to said drive shafts for actuating them, and means cooperates with said motor means for permitting coincidental axial and limited turning movement of said drive shafts with said housing.

13. Driving apparatus for rotational mounting on a shaft portion of a heavy device positioned for rotation on opposed supports, a driven gear securely-mounted on the shaft portion for imparting rotative movement thereto, a housing rotationally-mounted on the shaft portion about said driven gear, driving gear means operatively-meshing with said driven gear and rotationally-carried by said housing, said driving gear means having a pair of drive shafts rotationally-positioned by said housing adjacent a lower portion thereof in a diagonally-outwardly spaced relation with respect to the shaft portion and in a spaced-apart balanced relation with each other, a pair of opposed means projecting in the same direction from said housing, and means cooperating with said pair of opposed means for resisting and containing turning movement of said housing.

14. Driving apparatus as defined in claim 13 wherein, means cooperates with a shaft portion and said housing for positioning said housing for coincidental axial movement with the shaft portion, and means cooperates with said pair of opposed means and said last-mentioned means to provide for and guide coincidental axial movement of said housing.

15. Driving apparatus as defined in claim 13 wherein said pair of opposed means comprises a pair of downwardly-projecting arms secured to the bottom portion of said housing in the spacing between said drive shafts; said means for resisting and containing turning movement comprises a centrally-positioned snubber unit between said arms; and means projects from said arms into engagement with opposite ends of said snubber unit.

16. Driving apparatus as defined in claim 13 wherein, the mounted positioning of said drive gear means with respect to said housing provides off-center weight that resists turning movement of said housing, and said means cooperating with said pair of opposed means has means connecting it therewith to provide for coincidental axial movement of said housing with the shaft portion.

17. Driving apparatus as defined in claim 13 wherein, means is provided for maintaining said housing in substantial coaxial alignment on the shaft portion, and said driving gear means has a pinion secured on each shaft of said pair of drive shafts and meshing with said driven gear.

18. Driving apparatus as defined in claim 17 wherein, said pair of opposed means projects centrally-downwardly from said housing beneath said pinions, and said means for resisting and containing turning movement is operatively-positioned between said pair of opposed means.

19. Driving apparatus as defined in claim 17 wherein means is associated with said means for resisting and containing turning movement of said housing for adjusting it between a balanced and an off-balanced force resistance to turning movement of said housing.

References Cited
UNITED STATES PATENTS

| | | | |
|---|---|---|---|
| 2,802,377 | 8/1957 | Berthiez | 74—411 X |
| 2,844,048 | 7/1958 | Bennett et al. | 74—411 X |
| 3,167,975 | 2/1965 | Durand | 74—665 |
| 3,186,255 | 6/1965 | Schmitter et al. | 74—606 |
| 3,197,187 | 7/1965 | Lakin et al. | 74—606 X |
| 3,207,002 | 9/1965 | Lakin et al. | 74—411 X |
| 3,299,729 | 1/1967 | Durand | 74—411 |

DONLEY J. STOCKING, *Primary Examiner.*

LEONARD H. GERIN, *Examiner.*

UNITED STATES PATENT OFFICE
CERTIFICATE OF CORRECTION

Patent No. 3,364,773              January 23, 1968

Martin C. Falk

It is hereby certified that error appears in the above numbered patent requiring correction and that the said Letters Patent should read as corrected below.

Column 4, line 56, for "axis" read -- axial --; column 6, line 2, for "with" read -- within --.

Signed and sealed this 15th day of April 1969.

(SEAL)
Attest:

Edward M. Fletcher, Jr.              EDWARD J. BRENNER

Attesting Officer                  Commissioner of Patents